United States Patent
Yu

(10) Patent No.: US 6,525,843 B1
(45) Date of Patent: Feb. 25, 2003

(54) METHOD FOR COINCIDING RESOLUTIONS OF FACSIMILE DEVICES HAVING DIFFERENT SYSTEMS OF MEASUREMENT

(75) Inventor: Sang-Yun Yu, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/190,279

(22) Filed: Nov. 13, 1998

(30) Foreign Application Priority Data

Nov. 13, 1997 (KR) .............................. 97-59621

(51) Int. Cl.$^7$ ................................................ H04N 1/36
(52) U.S. Cl. ..................... 358/412; 358/406; 358/409; 358/504; 358/434; 358/435
(58) Field of Search ................................ 358/412, 400, 358/407, 434, 442, 481, 405, 406, 219, 409–411, 504, 486, 435, 438; 375/219

(56) References Cited

U.S. PATENT DOCUMENTS

| | | | |
|---|---|---|---|
| 4,876,604 A | * 10/1989 | Nobuta ..................... 358/400 |
| 4,961,185 A | * 10/1990 | Sawada ..................... 370/79 |
| 4,970,603 A | * 11/1990 | Kanai ....................... 358/400 |
| 4,974,097 A | * 11/1990 | Kaneko et al. ............. 358/400 |
| 5,041,915 A | *  8/1991 | Hirota et al. .............. 358/400 |
| 5,146,352 A | *  9/1992 | Nannichi ................... 358/451 |
| 5,189,525 A | *  2/1993 | Kotani ...................... 358/407 |
| 5,463,295 A | * 10/1995 | Inde .......................... 358/442 |
| 5,477,342 A | * 12/1995 | Sato .......................... 358/481 |
| 5,517,324 A | *  5/1996 | Fite, Jr. et al. ............ 358/434 |
| 5,559,611 A | *  9/1996 | Bloomfield et al. ........ 358/407 |
| 5,943,138 A | *  8/1999 | Fujiki ....................... 358/407 |
| 5,943,139 A | *  8/1999 | Tang et al. ................. 358/412 |
| 6,067,172 A | *  5/2000 | Yokoyama .................. 358/442 |
| 6,141,110 A | * 10/2000 | Isozaki ..................... 358/1.12 |

* cited by examiner

Primary Examiner—Edward Coles
Assistant Examiner—Tia A Carter
(74) Attorney, Agent, or Firm—Robert E. Bushnell, Esq.

(57) ABSTRACT

Disclosed is a method for causing a coinciding of resolutions of facsimile devices having different systems of measurement. The different systems of measurement can be a metric system and an English system of measurements. The method according to the present invention includes the steps of: exchanging protocols between a transmission-side facsimile device and a reception-side facsimile and determining a designed unit and a resolution of the reception-side facsimile device; calculating a rotating velocity of a step motor to be adapted to the designed unit and the resolution; driving the step motor at the rotating velocity to scan a document; and transmitting data obtained from the document to the reception-side facsimile device. The method according to another aspect of the present invention includes the steps of: exchanging protocols between a transmission-side facsimile device and a reception-side facsimile device to determine a designed unit and a resolution of the transmission-side facsimile device when a communication line is established between the transmission-side facsimile device and the reception-side facsimile device; calculating a rotating velocity of the step motor to be adapted to the designed unit and the resolution; receiving data transmitted from the transmission-side facsimile device; and driving the step motor at the rotating velocity to print the data received to the reception-side facsimile device.

20 Claims, 8 Drawing Sheets

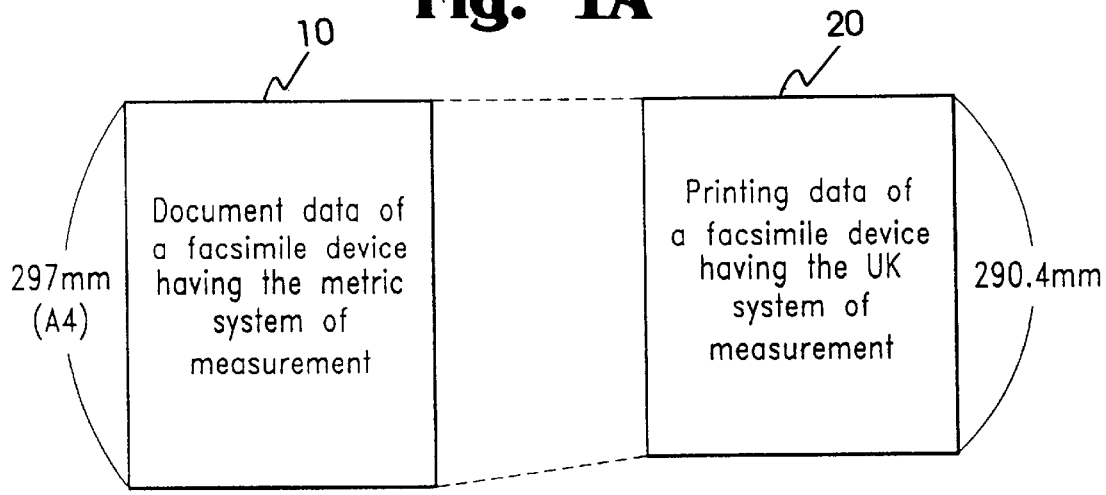
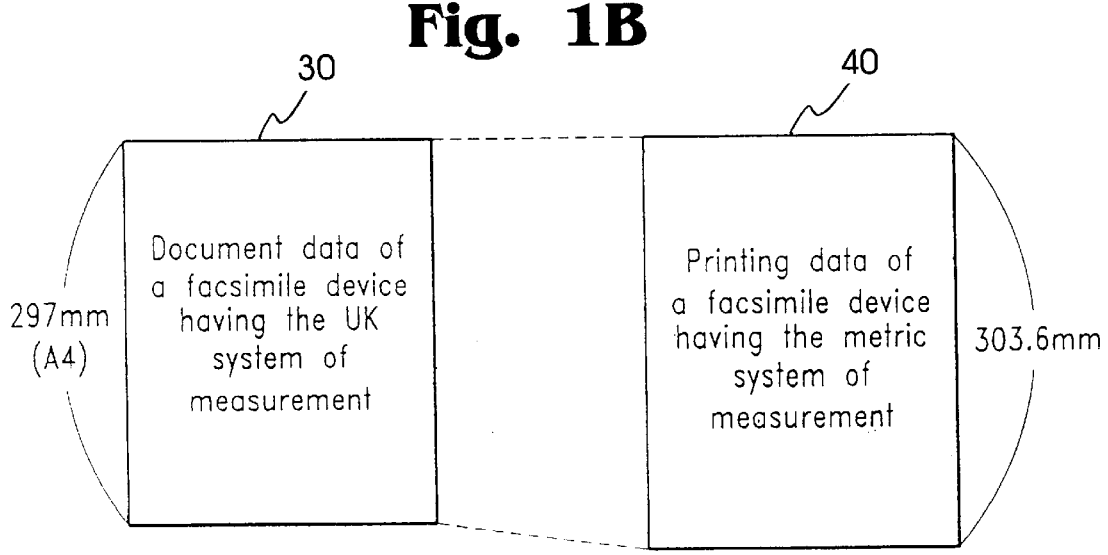

METHOD FOR COINCIDING RESOLUTIONS OF FACSIMILE DEVICES HAVING DIFFERENT SYSTEMS OF MEASUREMENT

CLAIM OF PRIORITY

This application makes reference to, incorporates the same herein, and claims all benefits accruing under 35 U.S.C. §119 from an application entitled METHOD FOR LINE LENGTH ERROR REVISION BY UNIT IN FACSIMILE earlier filed in the Korean Industrial Property Office on Nov. 13, 1997, and there duly assigned Serial No. 97-59621, a copy of which is annexed hereto.

BACKGROUND OF THE INVENTION

1. Technical Field

The present invention relates to a method for coinciding resolutions of facsimile devices, more particularly to a method for causing resolutions of facsimile devices to coincide when those facsimile devices have different systems of measurement such as a metric system and a English system of measurement.

2. Related Art

Generally, facsimile technology can be described as follows. A user can transmit information from an original document at a first location to a second location through a telephone line, with the use of facsimile technology. To accomplish this, the user utilizes a touch pad on a first facsimile system at the first location to dial up a second facsimile system at the second location. This operation is similar to dialing a telephone number on a telephone set.

The user then slides the original document into the first facsimile system's scanner, and the document curls around a drum in front of a photodetector. The first facsimile system scans the image on the surface of the document as a series of lines, takes the lines one at a time, and then appends all of the lines scanned from the document to form a continuous stream of information. The first facsimile system converts this stream of information into a series of modulated tones for transmission over the telephone line. After making a connection with the second facsimile system at the second location, the first facsimile system transmits the series of modulated tones to the second facsimile system. Then the second facsimile system converts the series of modulated tones into dots representing the original image from the original document. A printer within the second facsimile system forms an image onto a sheet of paper at the second location, thereby completing the transmission of information from the original document at the first location to the second location.

There can be times when a resolution setting of the aforementioned first facsimile system is not identical to a resolution setting of the aforementioned second facsimile system, thereby resulting in incompatibilities or a decrease in the quality of the image formed at the second facsimile system.

I have found that incompatibilities of resolution settings and measurement setting among a first sending facsimile system and a second receiving facsimile system can result in a decrease in the quality of the image formed at the receiving facsimile system. Efforts have been made to reduce the occurrence of such problems.

Exemplars of recent efforts in the art include U.S. Pat. No. 5,559,611 for FACSIMILE STORE AND FORWARD SYSTEM WITH LOCAL INTERFACE issued to Bloomfield et al., U.S. Pat. No. 5,517,324 for METHOD AND SYSTEM FOR INCREASING THE COMPATIBILITY OF A FAX MACHINE issued to Fite, Jr. et al., U.S. Pat. No. 5,463,295 for FACSIMILE APPARATUS WITH CONTROL OF RESOLUTION TO BE COMPATIBLE WITH RECEIVING SIDE issued to Inde, U.S. Pat. No. 4,970,603 for FACSIMILE COMMUNICATION SYSTEM issued to Kanai, and U.S. Pat. No. 4,876,604 for APPARATUS FOR COMMUNICATING IMAGE DATA OF DIFFERENT RESOLUTIONS issued to Nobuta.

While these recent efforts provide advantages, I note that they fail to adequately provide a method for efficiently and conveniently causing resolutions of a sending and receiving facsimile systems to coincide.

SUMMARY OF THE INVENTION

The present invention has been made to overcome the above described problems. It is an object of the present invention to provide a method for coinciding resolutions of facsimile devices having different systems of measurement such as a metric system and an English (United Kingdom) system of measurement from each other by varying a rotating velocity of a step motor conveying a document and a recording paper.

To accomplish the above objects of the present invention, according to the first aspect of the present invention, there is provided a method for coinciding resolutions of facsimile devices having different systems of measurement such as a metric system and an English or United Kingdom (UK) system of measurement from each other, which includes the steps of: exchanging protocols between a transmission-side facsimile device and a reception-side facsimile device and determining a resolution and an designed unit of the reception-side facsimile device; calculating a rotating velocity of the electric motor to be adapted to the designed unit system and the resolution; scanning the document by driving the electric motor at the rotating velocity; and transmitting data to be obtained from the document by scanning the document to the reception-side facsimile device.

According to the second aspect of the present invention, a method for coinciding resolutions of facsimile devices having different systems of measurement such as a metric system and an English system of measurement from each other, comprising the steps of: exchanging protocols between a transmission-side facsimile device and a reception-side facsimile device to determine a designed unit system and a resolution of the transmission-side facsimile device when a communication line is established between the transmission-side facsimile device and the reception-side facsimile device; calculating a rotating velocity of the electric motor to be adapted to the designed unit system and the resolution; receiving data transmitted from the transmission-side facsimile device; and driving the electric motor at the rotating velocity and printing the received data.

To achieve these and other objects in accordance with the principles of the present invention, as embodied and broadly described, the present invention provides a method, comprising: transmitting first data from a first device to a second device, said first data corresponding to a first unit system of said first device, said first unit system of said first device being different from a second unit system of said second device; calculating a rotating velocity of a motor of said second device in accordance with said first data; receiving second data from said first device to said second device; and driving said motor of said second device at said rotating velocity and forming an image on a recordable medium corresponding to said second data received from said first device.

To achieve these and other objects in accordance with the principles of the present invention, as embodied and broadly described, the present invention provides a method, comprising: transmitting first data from a first device to a second device, said first data corresponding to a first unit system of said first device, said first unit system of said first device being different from a second unit system of said second device; calculating a rotating velocity of a motor of said second device in accordance with said first data; reading image data from an original document and forming second data, said reading being performed by said second device, said second data corresponding to the image data of the original document, and said reading being performed by driving said motor of said second device at said rotating velocity; and transmitting said second data from said second device to said first device.

To achieve these and other objects in accordance with the principles of the present invention, as embodied and broadly described, the present invention provides an apparatus, comprising: a scanner reading image data from an original document; a motor controlling a transporting of the original document through said apparatus; a first transceiver unit transmitting first data corresponding to said image data read from the original document and receiving second data; a second transceiver unit transmitting said second data and receiving said first data, said second data corresponding to a second unit system of said second transceiver unit, wherein a first unit system of said apparatus is different from said second unit system of said second transceiver unit; and a central processing unit coupling and controlling said scanner, said motor, and said first transceiver unit, said central processing unit calculating a rotating velocity of said motor in accordance with said second data received from said second transceiver unit, said central processing unit driving said motor at said rotating velocity.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 1A and 1B respectively show states when data are transmitted and received between facsimile devices having different unit systems from each other, the resolution of data on papers have a tolerance;

DETAILED DESCRIPTION OF THE PREFERRED EMBODIMENT

Figure 2:
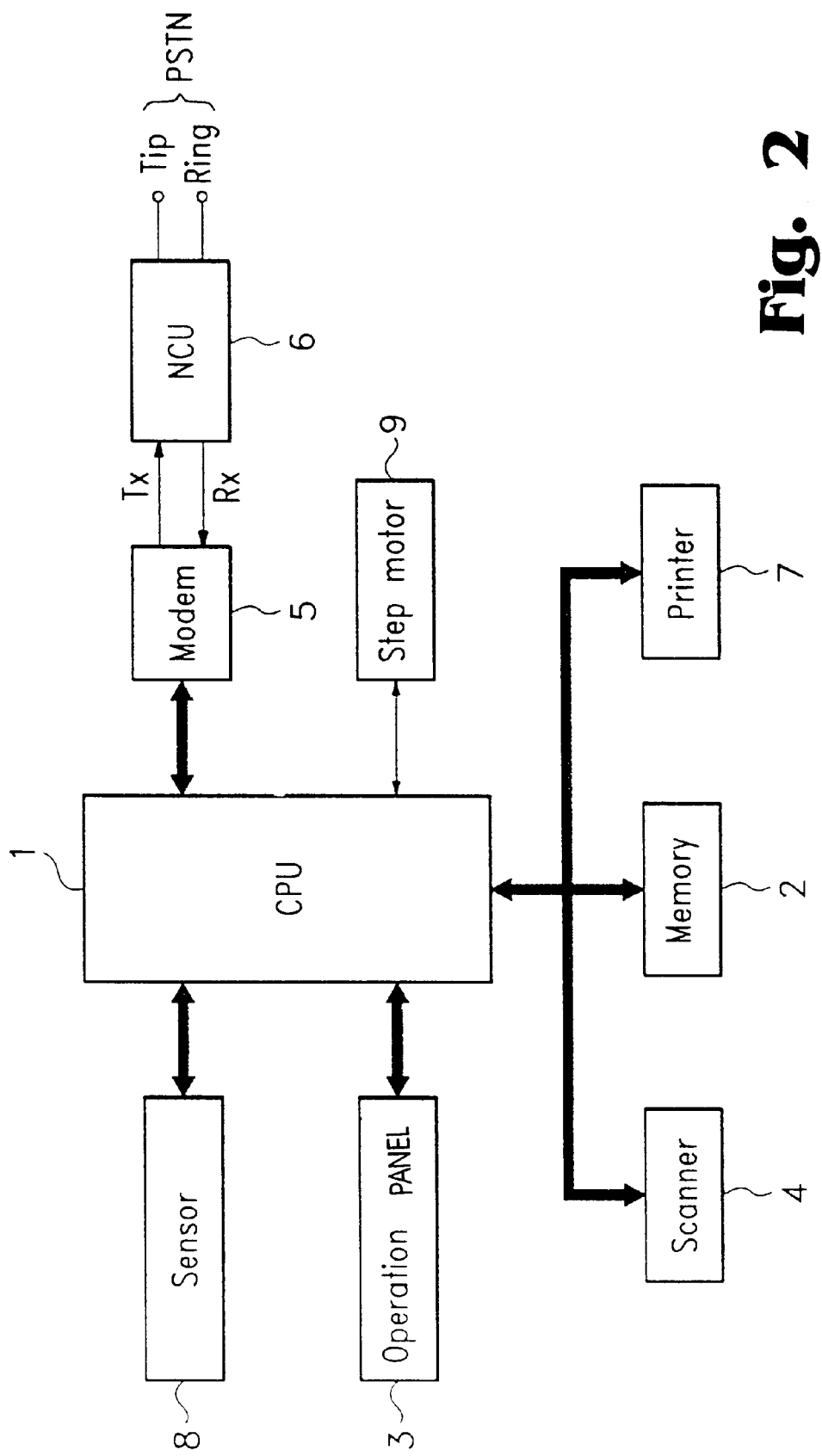
FIG. 2 is a block diagram schematically showing a facsimile device, in accordance with the principles of the present invention.

Generally, a communication technique using facsimile devices in field of data transmission techniques is a matter of transmitting image data from a specified transmission-side facsimile device to a specified reception-side facsimile device through a public switching telephone network (PSTN).

The facsimile devices to which the facsimile communication technique is applied transmit and receive data between the facsimile devices according to the rules of the International Telecommunication Union-the telecommunication standardization sector (ITU-T) about the telecommunication.

The International Telecommunications Union (ITU) is an international standards organization that is part of the United Nations. The International Telecommunications Union (ITU), formerly known as the International Telegraph and Telephone Consultative Committee (CCITT), comprises an international committee established to promote standards for the development of telephone, telegraph systems, and data networks and to create the environment for interworking between the networks of the different countries of the world.

The facsimile devices are divided into a facsimile device using the metric system of measurement and a facsimile device using the English system of measurement with reference to regions in which the facsimile devices are used. In the case of using a scanner which scans data in a line scanning way, the facsimile devices are designed to scan data recorded on a document in a line by line manner.

The facsimile device which is designed to have the metric system of measurement are divided into three type of facsimile devices in view of the accuracy of a scanner as follows:

(1) Standard mode: set the length of a dot to the extent of 1/3.85 millimeters (mm).

(2) Fine mode: set the length of a dot to the extent of 1/7.7 mm.

(3) Super fine mode: set the length of a dot to the extent of 1/15.4 mm.

In the case of mounting each scanner having such accuracy in each facsimile device which is designed to take the English system of measurement, in view of the conversion of the resolution for the image from the metric system of measurement into the English system of measurement, the resolution in the standard mode is about 98 dots per inch (dpi) and in the fine mode about 196 dots per inch. On the other hand, the resolution in the super fine mode is about 391 dots per inch.

As a 300 dots per inch of the resolution for image in the facsimile device is established as a standard by International Telecommunications Union-Telecommunication sector (ITU-T), which is the same as that in a general printer, however, a multiple relationship is not established between the metric system of measurement provided as one of the standards and the English system of measurement provided as the other of the standards in the rules.

The facsimile devices having the English system of measurement are divided into two types of facsimile devices in view of the accuracy of a scanner as follows:

(1) Fine mode: set the length of a dot to the extent of 1/200 inch. When converting the English system into the metric system of measurement, it is 1/7.87 mm.

(2) Super fine mode: set the length of a dot to the extent of 1/300 inch. In the metric system of measurement, it is 1/11.81 mm.

Turn now to FIGS. 1A and 1B, which respectively show states when data are transmitted and received between facsimile devices having different unit systems from each other, the resolution of data on papers have a tolerance.

When an English (UK) facsimile device which has the resolution of 300 dots per inch and an algorithm for converting the resolution of 200 dots per inch into the resolution of 300 dots per inch receives and prints the facsimile data transmitted from the facsimile device which is designed to have the metric system of measurement and operates in the fine mode, the facsimile data are printed on a paper in the reduction of size by about 2.2% as shown in FIG. 1A. In other words, an original document having an original image 10 of size 297 millimeters is reduced by 2.2% so that the received image 20 has size 290.4 millimeters.

To the contrary, when the facsimile device which has the resolution of 300 dots per inch scans the document and transmits the facsimile data converted to have the resolution of 200 dots per inch and the facsimile device having the metric system of measurement receives and prints the facsimile data transmitted from the facsimile device having the English (UK) system of measurement, the facsimile data are printed on a paper in the enlargement of size by 2.2% as shown in FIG. 1B. In other words, an original document having an original image 30 of size 297 millimeters is enlarged by 2.2% so that the received image 40 has size 303.6 millimeters.

Therefore, facsimile devices have a problem as follows. Since the facsimile device having the metric system of measurement has the resolution of about 196 dots per inch in the fine mode not to coincide with the resolution of 200 dots per inch of the facsimile device having the English (UK) system of measurement, there is no a method for coinciding resolutions of facsimile devices having different systems of measurement such as a metric system and an English (UK) system of measurement from each other in spite of using the algorithm of converting the resolutions of 200 dots per inch and 300 dots per inch into each other To coincide the resolutions of the facsimile devices having the different systems of measurement from each other, there is proposed that a chip containing a separate processing program is mounted in the facsimile device. Since the proposition causes the cost of manufacturing the separate chip to rise, the cost-competitiveness of the facsimile device to which the chip is applied is decreased in view of the cost.

It is possible to carry out an edit operation such as deletion and copy of the line which is printed so as to coincide the resolutions of the facsimile devices having the different systems of measurement from each other. However, this causes the quality of the image to be degraded.

Hereinafter, a preferred embodiment of the present invention will be described in detail with reference to the accompanying drawings.

Turn now to FIG. 2, which is a block diagram schematically showing a facsimile device, in accordance with the principles of the present invention. As shown in FIG. 2, a central processing unit (CPU) 1 controls operations of the facsimile device in accordance with a preset program. A memory 2 has program data, protocol data, character data, and information for transmission and reception of data stored therein. Such data are accessed or stored in the memory 2 by means of the central processing unit 1 controlling the memory 2.

An operation panel 3 includes a plurality of keys to generate key data in the facsimile device and transmits the key data to the central processing unit 1 after the key data are generated. The operation panel 3 also includes a display showing display data which transmitted from the central processing unit 1.

A scanner 4 scans data recorded on a document to convert the data into image data as digital data before transmitting the data to the central processing unit 1. A modem 5 is controlled by the central processing unit 1 to modulate the data outputted from the central processing unit 1 to analog data and to demodulate the analog data to digital data.

A network control unit (NCU) 6 operates to construct a communication loop with public switching telephone network (PSTN) (including RING and TIP) and to interface signals of public switching telephone network (PSTN) and the modem 5 according to the control signal of the central processing unit 1. The modem 5 transmits (Tx) to the network control unit 6 and receives (Rx) from the network control unit 6.

A printer 7 prints a facsimile data received to the facsimile device according to the control signal of the central processing unit 1. A sensor 8 detects a remainder of recording papers and senses a document to provide data with respect to the recording papers and the document for the central processing unit 1. A step motor 9 conveys the document or the recording paper at a distance adapted to the predetermined resolution according to the control signal of the central processing unit 1.

Hereinafter, operations of the facsimile device according to the present invention will be described with reference to FIGS. 3 to 8. Two embodiments of the present invention will be described as follows.

Figure 3:
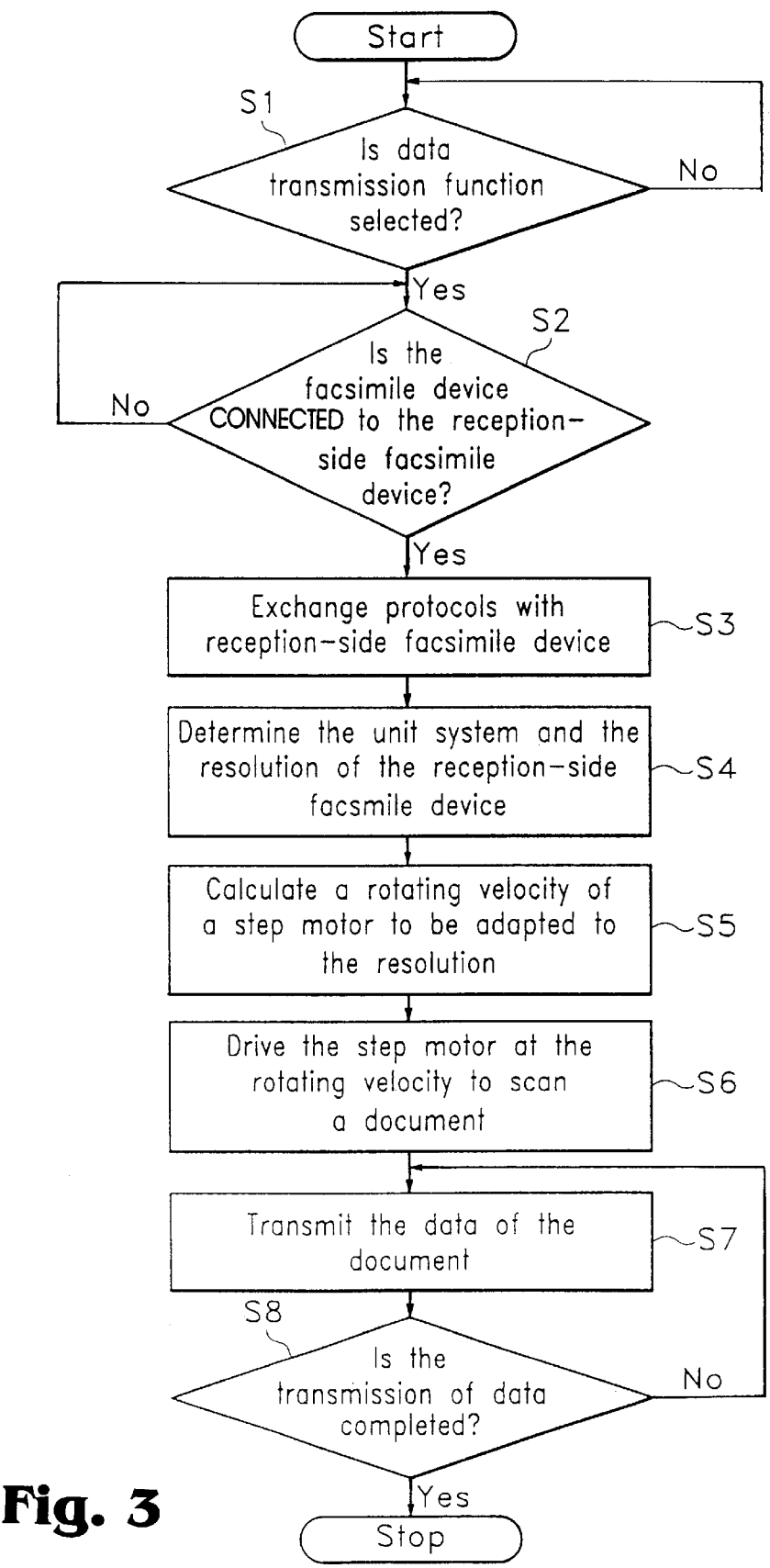
FIG. 3 is a flow chart showing a process of carrying out coinciding the resolutions of the facsimile devices having the different systems of measurement from each other for a first embodiment, in accordance with the principles of the present invention.

Turn now to FIG. 3, which is a flow chart showing a process of carrying out coinciding the resolutions of the facsimile devices having the different systems of measurement from each other for a first embodiment, in accordance with the principles of the present invention. A first embodiment of the present invention utilizes a process depicted in FIG. 3.

In the first embodiment, the transmission-side facsimile device determines the unit system and the resolution of the reception-side facsimile and controls a rotating velocity of the step motor during the scan of the document so as to vary a convey distance of document per a second. Then, the reception-side facsimile prints the facsimile data transmitted from the transmission-side facsimile device.

Figure 8:
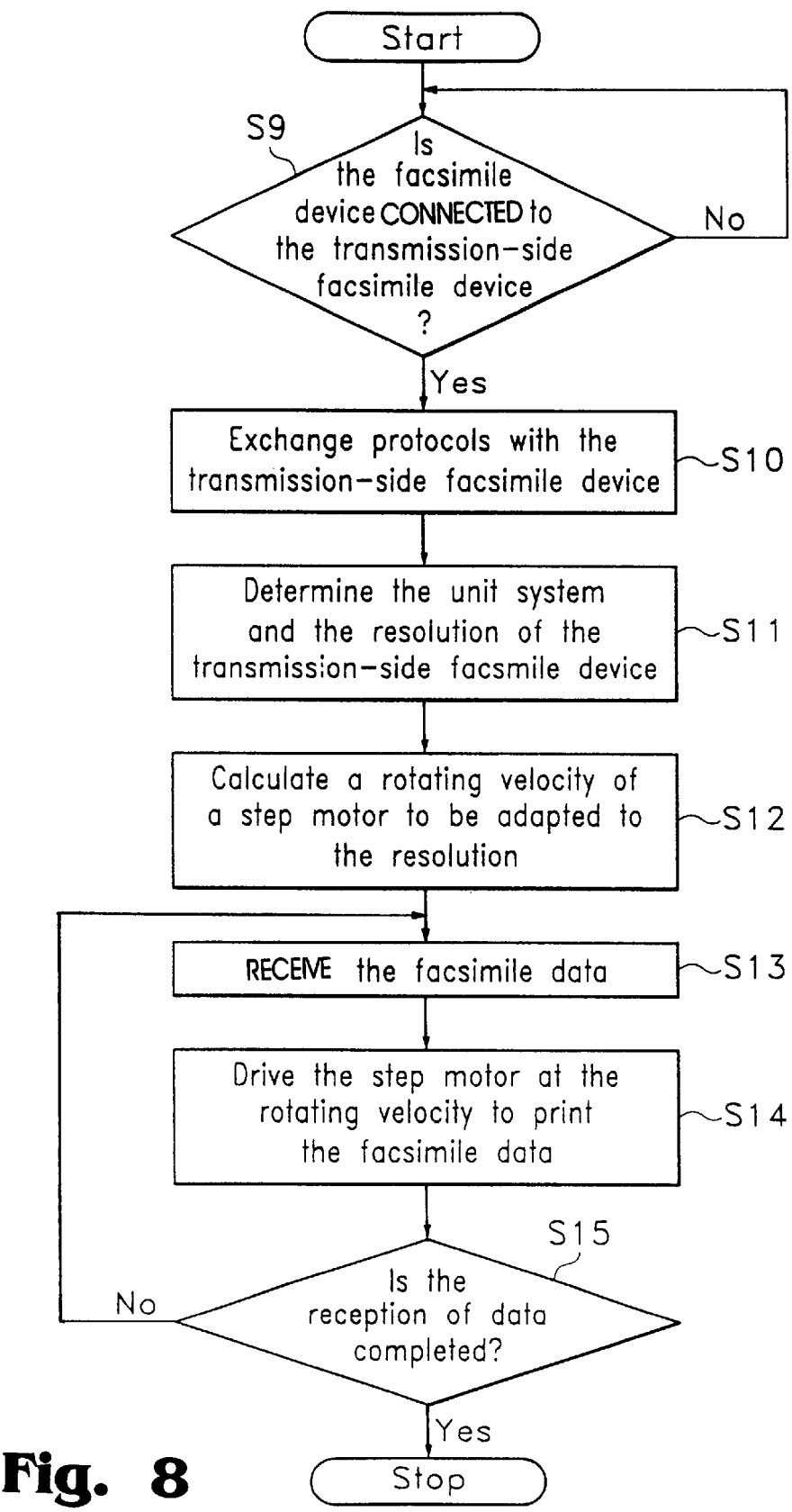
FIG. 8 is a flow chart showing a process of carrying out coinciding the resolutions of the facsimile devices having the different systems of measurement from each other for a second embodiment, in accordance with the principles of the present invention.

Turn now to FIG. 8, which is a flow chart showing a process of carrying out coinciding the resolutions of the facsimile devices having the different systems of measurement from each other for a second embodiment, in accordance with the principles of the present invention. A second embodiment of the present invention utilizes a process depicted in FIG. 8.

In the second embodiment, the transmission-side facsimile device transmits the facsimile data and the reception-side facsimile device determines the unit system and the resolution of the transmission-side facsimile device and controls a rotating velocity of the step motor adapted to the determination so as to vary the convey distance of the recording paper per the second during the printing of the facsimile data.

Hereinafter, a process of coinciding the resolutions of the facsimile devices having the different systems of measurement from each other according to the first embodiment of the present invention will be described with reference to FIG. 3.

In FIG. 3, at step S1, when a user selects a transmission mode in the transmission-side facsimile device to transmit the facsimile data, the central processing unit 1 controls the modem 5 to dial a telephone number of the reception-side facsimile device. At step S2, a communication line is established between the transmission-side facsimile device and the reception-side facsimile device. At step S3, the transmission-side facsimile device exchanges protocols with the reception-side facsimile device. At this time, the protocols are exchanged between the transmission-side facsimile device and the reception-side facsimile device in such a manner as shown FIG. 4.

Figure 4:
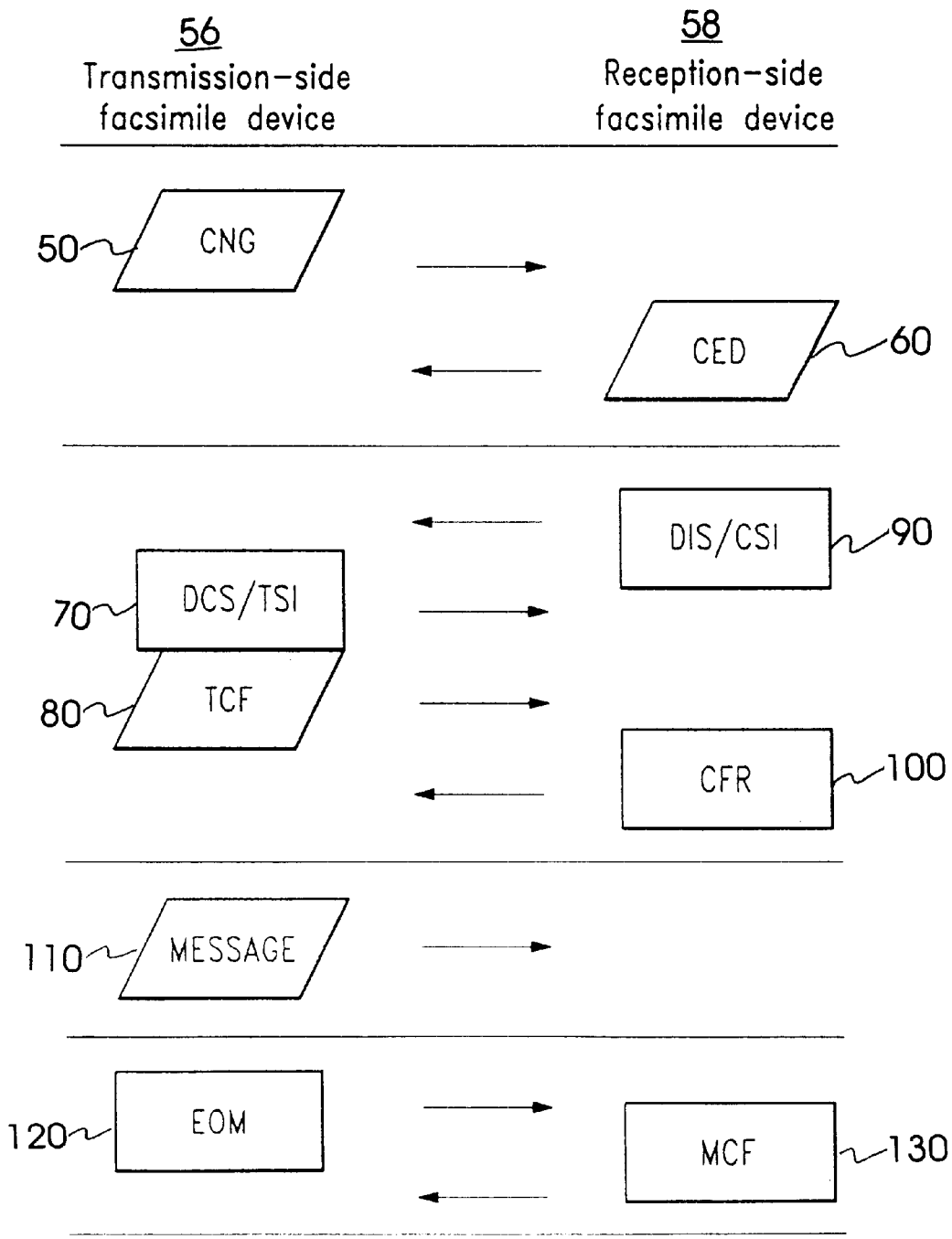
FIG. 4 shows a process of exchanging protocols between a transmission-side facsimile device and a reception-side facsimile device, in accordance with the principles of the present invention.

Turn now to FIG. 4, which shows a process of exchanging protocols between a transmission-side facsimile device 56 and a reception-side facsimile device 58, in accordance with the principles of the present invention. In other words, at step S3 of FIG. 3, the protocols are exchanged between the transmission-side facsimile device 56 and the reception-side facsimile device 58 in such a manner as shown FIG. 4. That is, the transmission-side facsimile device 56 transmits a calling tone signal 50 (hereinafter, referred to as CNG signal 50) to the reception-side facsimile device 58. The reception-side facsimile device 58 transmits a called station identification signal 60 (hereinafter, referred to as CED signal 60) responsive to the CNG signal 50 to the transmission-side facsimile device 56. Then, the transmission-side and reception-side facsimile devices exchange a digital identification signal 90 (hereinafter, referred to as DIS 90) and a digital command signal 70 (hereinafter, referred to as DCS 70) having a high level data link control format (hereinafter, referred to as HDLC format) with each other. In FIG. 4, the term "TSI" at DCS 70 represents a transmitting subscriber identification and the term "CSI" at DIS 90 represents a called subscriber identification.

In FIG. 4, the transmission-side facsimile device 56 transmits a transmission confirmation signal 80 (hereinafter, referred to as TCF signal 80) to the reception-side facsimile device 58 and the reception-side facsimile device 58 transmits a confirmation to a reception signal 100 (hereinafter, referred to as CFR signal 100) responsive to the TCF signal 80 to the transmission-side facsimile device 56. Then, the transmission-side facsimile device 56 transmits a message or messages 110 to the reception-side facsimile device 58 and also transmits an end of message signal (EOM) 120 informing a completion of message transmission to the reception-side facsimile device 58 after transmitting the message or messages 110. The reception-side facsimile device 58 transmits a message confirmation signal (MCF signal) 130 informing of receiving the message to the transmission-side facsimile device 56. This results in a completion of message transmission.

Figure 5:
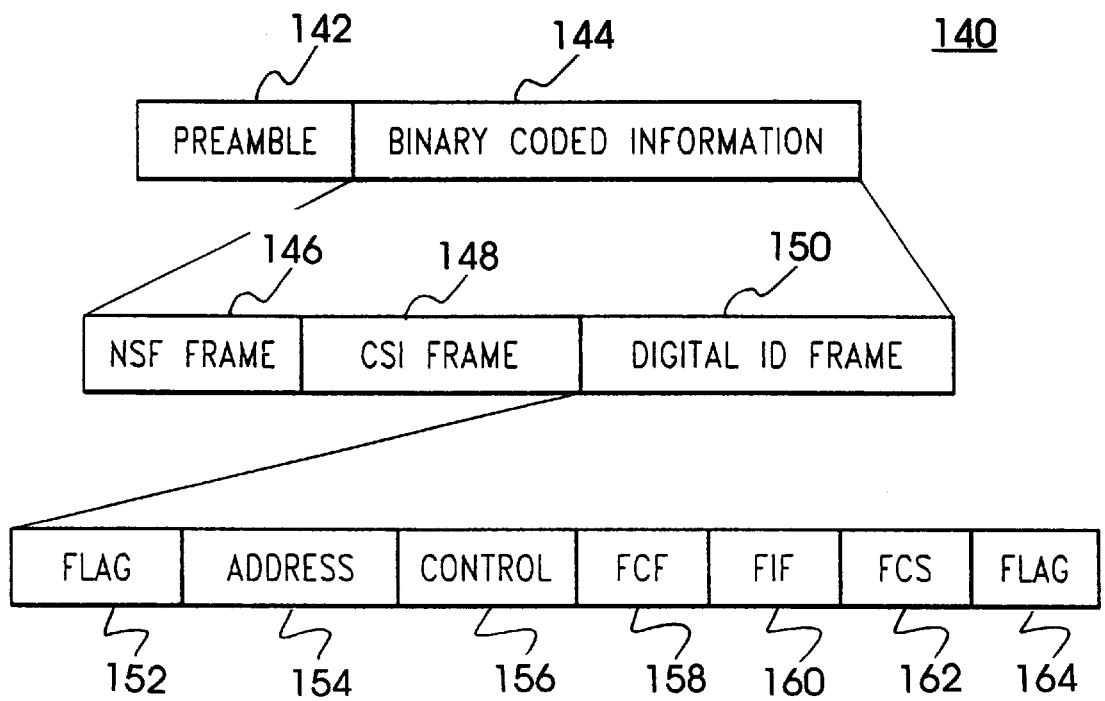
FIG. 5 shows a construction of a high level data link control (HDLC) format.

Turn now to FIG. 5, which shows a construction of a high level data link control (HDLC) format 140. FIG. 5 includes a preamble 142, binary coded information 144, NSF frame 146, CSI frame 148, digital id frame 150, flag 152, address 154, control 156, FCF 158, FIF 160, FCS 162, and flag 164. FCF 158 as one of elements constructing HDLC format 140 means kind of information which the transmission-side facsimile device 56 and the reception-side facsimile device 58 exchange with each other. FIF 160 is an information area including the information which is exchanged by the transmission-side facsimile device 56 and the reception-side facsimile device 58, which is transmitted from the transmission-side facsimile device 56 to the reception-side facsimile device 58 just before a substantial data are transmitted to the reception-side facsimile device 58.

In FIG. 3, at step S4, the transmission-side facsimile device determines the unit system and the resolution of the reception-side facsimile device through the information which is included in DIS and DCS. At step S5, the transmission-side facsimile device calculates the rotating velocity of the step motor to be corresponding to the resolution of the reception-side facsimile device. At step S6, the transmission-side facsimile device scans the document with the step motor 9 driving at the calculated rotating velocity.

Figure 6A:
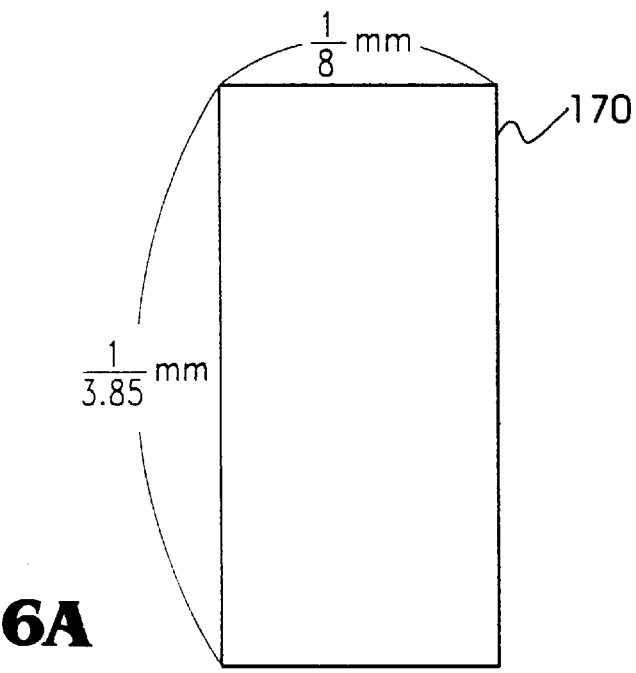
FIGS. 6A to 6D respectively show dots having a predetermined size according to the rules of International Telecommunication Union.
Figure 6B:
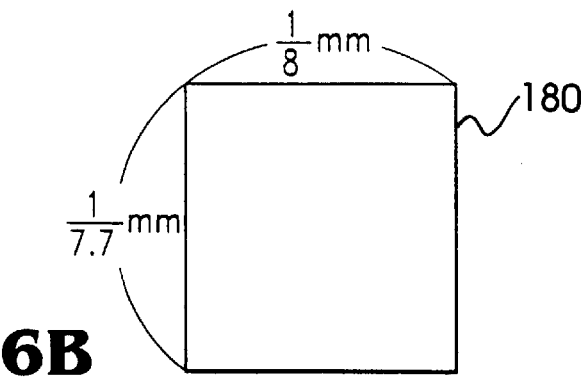
Figure 6C:
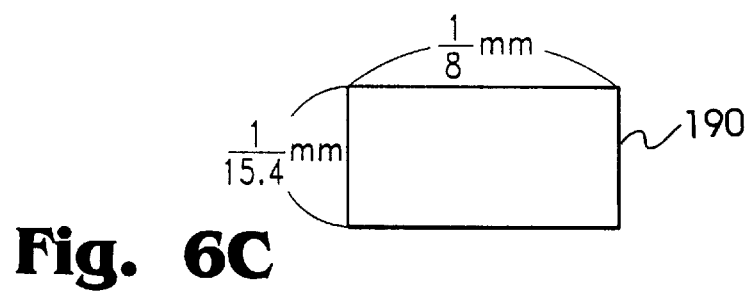
Figure 6D:
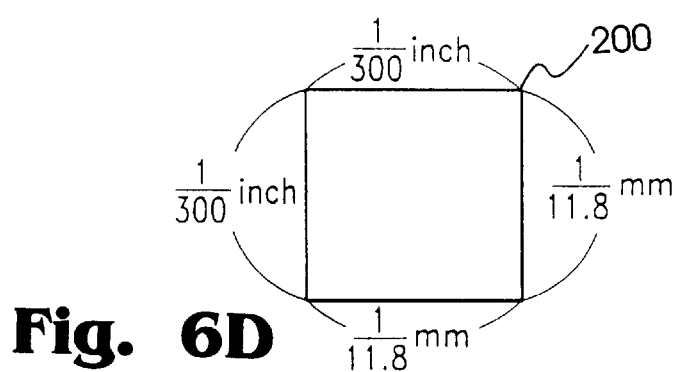

Turn now to FIGS. 6A through 6D, which respectively show dots having a predetermined size according to the rules of International Telecommunication Union. The rules of International Telecommunications Union-Telecommunication standards sector (ITU-T) provide four types of dot sizes as shown in FIGS. 6A to 6D. The dots as shown in FIGS. 6A to 6C are respectively printed by facsimiles devices having the metric system of measurement and the dot as shown in FIG. 6D is printed by a facsimile device having the English system of measurement. FIG. 6A shows a first type 170 of dot size, FIG. 6B shows a second type 180 of dot size, FIG. 6C shows a third type 190 of dot size, and FIG. 6D shows a fourth type 200 of dot size.

When the facsimile data are transmitted from the facsimile device having the metric system of measurement, which has a scanner having the resolution of 300 dots per inch mounted therein, the lengths of dots must be converted to the extent of 1/3.85 millimeters (mm), 1/7.7 mm, or 1/15.4 mm. To convert the lengths of the dots, the facsimile device must control the rotating velocity of the step motor 9 of FIG. 2 and the conveying distance of the document per a second.

Figure 7A:
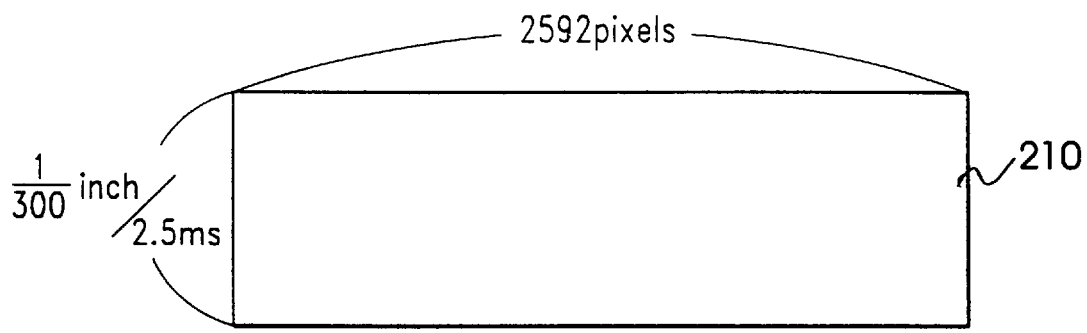
FIGS. 7A and 7B show lengths at which a scanner and a printer move as a step motor varies a rotating velocity thereof, in accordance with the principles of the present invention.
Figure 7B:
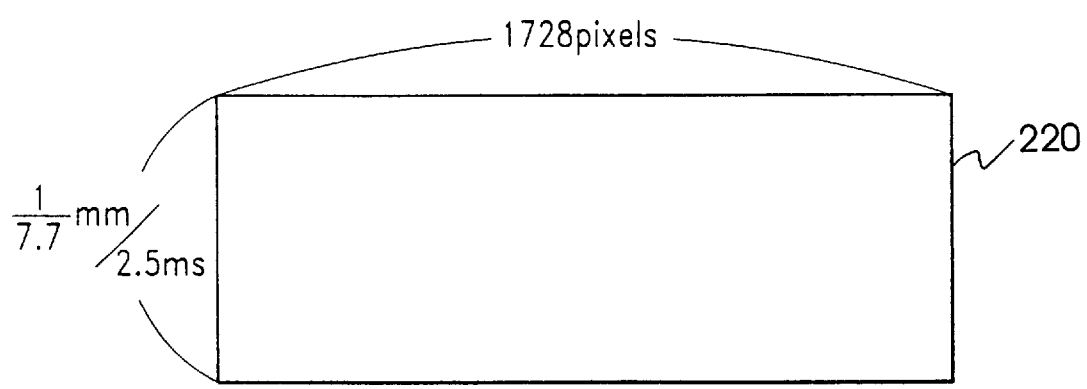

Turn now to FIGS. 7A and 7B, which show lengths at which a scanner and a printer move as a step motor varies a rotating velocity thereof, in accordance with the principles of the present invention. The rotating velocity of the step motor is represented by a pulse per a second provided that it takes the scanner 2.5 milliseconds (ms) to scan a dot. In the case of that the transmission-side facsimile device having the resolution of 300 dots per inch transmits the facsimile data to the reception-side facsimile device having the resolution of 300 dots per inch, when the step motor 9 drives at 400 pulses per second (pps) of the rotating velocity, the scanner 4 moves at a distance of 1/300 inch per 2.5 milliseconds in the lengthwise direction of a document so as to scan the document as shown in FIG. 7A. Thus, FIG. 7A shows 210.

On the other hand, in FIG. 7B, in the case of that the transmission-side facsimile device having the resolution of 300 dots per inch scans a document and transmits the facsimile data of the document to the reception-side facsimile device, when the rotating velocity of the step motor 9 is set to 613 pulses per second (pps), the scanner 4 moves at a distance of 1/7.7 millimeters (mm) per 2.5 milliseconds (ms) in the lengthwise direction of the document so as to scan the document. Thus, FIG. 7B shows 220.

In FIG. 3 at step S7, the facsimile data are transmitted to the reception-side facsimile device in a line by line or a page by page. When the transmission of the facsimile data is completed, the transmission-side facsimile device finishes all of process.

In the case of transmission and reception of the facsimile data between the facsimile devices having the same times to scan a line of data, when the facsimile data are transmitted from the transmission-side facsimile device having the English system of measurement to the reception-side facsimile device having the metric system of measurement, the lengths of the dots can be adjusted to each other by controlling the rotating velocity of the step motor 9 of FIG. 2. Such manner can be applied to the case of that the facsimile data are transmitted from the facsimile device having the metric system of measurement to the facsimile device having the English system of measurement.

Hereinafter, the process of coinciding the resolutions of the facsimile devices having the different systems of measurement from each other according to the second embodiment of the present invention will be described with reference to FIG. 8. The second embodiment is a variation of the first embodiment of the present invention. Accordingly, it is understood that FIGS. 4 to 7 are still used for the description of the second embodiment of the present invention.

In FIG. 8, at step S9, the reception-side facsimile device receives a ring signal from the transmission-side facsimile device to be connected with the communication line. At step S10, the reception-side facsimile device exchanges protocols with the transmission-side facsimile device. The protocols are exchanged between the facsimile devices in such a manner as the description with reference to FIGS. 4 and 5.

In FIG. 8, at step S11, the reception-side facsimile device determines the unit system and the resolution of the transmission-side facsimile device through DIS and DCS involved in the protocols exchanged with the transmission-side facsimile device. At step S12, the reception-side facsimile device calculates the rotating velocity of the step motor 9 of FIG. 2 corresponding to the resolution of the transmission-side facsimile device.

In FIG. 8, at step S13, the reception-side facsimile device receives the facsimile data from the transmission-side facsimile device. At step S14, the reception-side facsimile device drives the step motor 9 at the rotating velocity calculated in the step S12 to print the facsimile data.

At step S15, the reception-side facsimile device checks whether the reception of the facsimile data is completed, or not. When the reception of the facsimile data is completed, the reception-side facsimile device finishes all of process.

In the case of transmission and reception of the facsimile data between the facsimile devices having the same times to scan a line of data, when the facsimile data are transmitted from the transmission-side facsimile device having the English system of measurement to the reception-side facsimile device having the metric system of measurement, the lengths of the dots can be adjusted to each other by controlling the rotating velocity of the step motor 9 of FIG. 2. Such manner can be applied to the case of that the facsimile data are transmitted from the facsimile device having the metric system of measurement to the facsimile device having the English system of measurement.

With reference to the process of coinciding resolutions of facsimile devices having different systems of measurement such as a metric system and an English system of measurement from each other according to the present invention, the rotating velocity of the step motor is varied by using a simple program without adding a correcting device for the facsimile device so that the length of the dot can be adjusted. Thereby, it results in improving the competition of the facsimile device.

Also, the facsimile device according to the present invention provides the excellent image without separately editing the facsimile data to adjust the length of the dot on the recording paper.

The foregoing paragraphs describe the details of a method for coinciding resolutions of facsimile devices, more particularly to a method for coinciding resolutions of facsimile devices having different systems of measurement such as a metric system and an English system of measurement, when data are transmitted from a facsimile device to which the English system of measurement is applied to a facsimile device to which the metric system of measurement is applied or from the metric system of measurement to the English system of measurement.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method, comprising:

transmitting first data from a first device to a second device, said first data including a first unit system of said first device, said first unit system of said first device being different from a second unit system of said second device;

calculating a rotating velocity of a motor of said second device in dependence upon said first data;

reading image data at said first device, in accordance with said first unit system;

conveying said image data from said first device to said second device, said first device not converting said image data to a unit system other than said first unit system; and when said second device receives said image data from said first device, driving said motor of said second device at said calculated rotating velocity to form an image corresponding to said image data.

2. The method of claim 1, said first unit system of said first device being selected from among an English system and a metric system, and said second unit system of said second device being selected from said English system and said metric system.

3. The method of claim 1, said first device and said second device respectively including a first facsimile system and a second facsimile system.

4. The method of claim 1, said first data including a resolution of said second data.

5. The method of claim 1, said English system including inch increments and said metric system including millimeter increments.

6. The method of claim 1, said calculating being performed by said second device.

7. The method of claim 1, said driving of said motor at said calculated rotating velocity forming the image corresponding to said image data in accordance with said first unit system.

8. The method of claim 7, said reading of said image data at said first device corresponding to reading a document at said first device.

9. A method, comprising:

transmitting first data from a first device to a second device, said first data including a first unit system of said first device, said first unit system of said first device being different from a second unit system of said second device;

when said second device receives said first data from said first device, calculating a rotating velocity of a motor of said second device in dependence upon said first data;

driving said motor of said second device at said calculated rotating velocity to transport a document, and form image data corresponding to an image on the document, in accordance with said first unit system; and conveying said image data from said second device to said first device.

10. The method of claim 9, said first unit system of said first device being selected from among an English system and a metric system, and said second unit system of said second device being selected from said English system and said metric system.

11. The method of claim 9, said first device and said second device respectively including a first facsimile system and a second facsimile system.

12. The method of claim 9, said first data including a resolution of said second data.

13. The method of claim 9, said English system including inch increments and said metric system including millimeter increments.

14. The method of claim 9, said calculating being performed by said second device.

15. The method of claim 14, said second device not converting said image data to a unit system other than said first unit system.

16. The method of claim 9, further comprising when said image data is conveyed from said second device to said first device, forming an image corresponding to said image data on a recordable medium at said first device, said image formed at said first device corresponding to said image data received from said second device.

17. The method of claim 16, said calculating being performed by said first device.

18. An apparatus, comprising:

a first device, comprising:

a scanner reading image data from a document to form document data;

a motor controlling a transporting of the document when said scanner performs said reading of the image data;

a first transceiver unit receiving first data, said first transceiver unit transmitting said document data, said first transceiver unit having a first unit system; and a central processing unit being coupled to said first transceiver unit, said scanner, and said motor, said central processing unit controlling said first transceiver unit, said scanner, and said motor; and a second device being separately located from said first device, said second device comprising a second transceiver unit, said second transceiver unit having a second unit system different from said first unit system, said second transceiver unit transmitting said first data and receiving said document data, said first data corresponding to said second unit system;

said central processing unit calculating a rotating velocity of said motor of said first unit in dependence upon said first data, said central processing unit driving said motor at said calculated rotating velocity to form said document data at said first device in accordance with said second unit system.

19. The apparatus of claim 18, said first unit system of said first transceiver unit being selected from among an English system and a metric system, and said second unit system of said second transceiver unit being selected from said English system and said metric system.

20. The apparatus of claim 18, said first device corresponding to a first facsimile system, said second device being coupled to a second facsimile system.

* * * * *